US010896609B2

(12) United States Patent
Higuchi et al.

(10) Patent No.: US 10,896,609 B2
(45) Date of Patent: Jan. 19, 2021

(54) COOPERATIVE PARKING SPACE SEARCH BY A VEHICULAR MICRO CLOUD

(71) Applicant: Toyota Motor North America, Inc., Plano, TX (US)

(72) Inventors: Takamasa Higuchi, Mountain View, CA (US); Seyhan Ucar, Mountain View, CA (US); Onur Altintas, Mountain View, CA (US)

( * ) Notice: Subject to any disclaimer, the term of this patent is extended or adjusted under 35 U.S.C. 154(b) by 0 days.

(21) Appl. No.: 16/443,087

(22) Filed: Jun. 17, 2019

(65) Prior Publication Data
US 2020/0394914 A1 Dec. 17, 2020

(51) Int. Cl.
H04W 4/46 (2018.01)
G08G 1/14 (2006.01)
H04L 29/08 (2006.01)

(52) U.S. Cl.
CPC ............. *G08G 1/143* (2013.01); *H04L 67/10* (2013.01); *H04W 4/46* (2018.02)

(58) Field of Classification Search
CPC .......... G08G 1/14; G08G 1/141; G08G 1/143; G08G 1/161; G06F 17/30241; H04W 4/46; H04W 4/008; H04W 72/04; H04L 67/10; H04L 67/12; H04L 5/14
USPC ................. 340/932.2, 424.5, 539.13, 425.5; 701/408
See application file for complete search history.

(56) References Cited

U.S. PATENT DOCUMENTS

| | | | |
|---|---|---|---|
| 9,881,220 B2 * | 1/2018 | Koravadi | G06K 9/00825 |
| 9,984,572 B1 | 5/2018 | Newman | |
| 10,334,405 B2 | 6/2019 | Altintas et al. | |
| 10,438,390 B2 * | 10/2019 | Kim | G01C 21/365 |
| 10,525,881 B1 * | 1/2020 | Deshpande | B60Q 9/002 |
| 2015/0091741 A1 | 4/2015 | Stefik et al. | |
| 2017/0287331 A1 * | 10/2017 | Laur | H04W 84/005 |
| 2018/0146323 A1 | 5/2018 | Tseng et al. | |
| 2019/0132706 A1 | 5/2019 | Altintas et al. | |
| 2019/0132819 A1 | 5/2019 | Tseng et al. | |
| 2019/0191265 A1 | 6/2019 | Altintas et al. | |
| 2019/0197898 A1 * | 6/2019 | Espinosa Cardenas | G08G 1/0965 |
| 2019/0375397 A1 * | 12/2019 | Bae | B62D 15/027 |

OTHER PUBLICATIONS

Gerla, M., "Vehicular Cloud Computing," Proc. Med-Hoc-Net, 2012, pp. 152-155.
Lee, E. et al., "Vehicular Cloud Networking: architecture and design principles," IEEE Communications Magazine, vol. 52, No. 2, 2014, pp. 148-155.
Hagenauer, F. et al., "Vehicular micro clouds as virtual edge servers for efficient data collection," Proc. ACM CarSys, 2017, pp. 31-35.
(Continued)

*Primary Examiner* — Hung T Nguyen
(74) *Attorney, Agent, or Firm* — Burbage Law, P.C.; Jon-Michael Burbage; Elizabeth Ruzich

(57) ABSTRACT

The disclosure includes embodiments for cooperative parking space search by a vehicular micro cloud. In some embodiments, a method includes determining that an ego vehicle is traveling in search of an available parking space. In some embodiments, the method includes forming a vehicular micro cloud responsive to the determination that the ego vehicle is traveling in search of the available parking space.

20 Claims, 7 Drawing Sheets

(56) References Cited

OTHER PUBLICATIONS

Higuchi, T. et al., "On the Feasibility of Vehicular Micro Clouds," Proc. IEEE VNC, 2017, pp. 179-182.
Hagenauer, F. et al., "Parked cars as virtual network infrastructure: enabling stable V2I access for long-lasting data flows," Proc. ACM CarSys, 2017, pp. 57-64.
Mathur, Suhas et al., "ParkNet: drive-by sensing of road-side parking statistics," Proceedings of the 8th International Conference on Mobile Systems, Applications, and Services (MobiSys '10), 2010, pp. 123-136.

* cited by examiner

Message Data 193

- Vehicles and other client devices equipped with Dedicated Short Range Communication ("DSRC") transmit a Basic Safety Message ("BSM") at a regular interval.

- Each V2X message includes the following message data 195 describing one or more of the following for the vehicle that originally sent the V2X message:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle;
    (4) Path History of Vehicle (e.g., path history data);
    (5) Occupancy Data 192.

Figure 4A

Message Data 193

Part 1
GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type
Occupancy Data 192

Figure 4B

COOPERATIVE PARKING SPACE SEARCH BY A VEHICULAR MICRO CLOUD

BACKGROUND

The specification relates cooperative parking space search by a vehicular micro cloud.

Connected vehicles form clusters of interconnected vehicles (e.g., via vehicle-to-everything, i.e., "V2X") that are located at a similar geographic location. Such clusters are known as "vehicular micro clouds." The vehicles in the cluster make available their unused computing resources to the other members of the vehicular micro cloud.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer program product for a vehicular micro cloud that includes a set of connected vehicles that are operable to provide cooperative searching for an available parking space to the set of connected vehicles, where the computer program product includes a non-transitory memory storing computer-executable code that, when executed by a processor, causes the processor to: determine that an ego vehicle is traveling in search of the available parking space; form the vehicular micro cloud responsive to the determination that the ego vehicle is traveling in search of the available parking space, where forming the vehicular micro cloud includes transmitting a first vehicle-to-everything message (V2X message) to a remote vehicle with instructions to form the vehicular micro cloud which includes the ego vehicle and the remote vehicle. The computer program product also includes causing a sensor to record sensor data describing information about a candidate parking space. The computer program product also includes determine, based on the sensor data, occupancy data describing whether the candidate parking space is the available parking space. The computer program product also includes transmit a second V2X message to the set of connected vehicles describing that the candidate parking space is the available parking space. Other embodiments of this aspect include corresponding computer systems, apparatus, and computer programs recorded on one or more computer storage devices, each configured to perform the actions of the methods.

Implementations may include one or more of the following features. The computer program product where the ego vehicle is an autonomous vehicle that acts to occupy the available parking space responsive to the determination that the candidate parking space is the available parking space. The computer program product where the remote vehicle is an autonomous vehicle that acts to occupy the available parking space responsive to receiving the second V2X message. The computer program product where the ego vehicle is an autonomous vehicle that optimizes a route of travel of the ego vehicle to responsive to determining that the candidate parking space is the available parking space. The computer program product where the remote vehicle is an autonomous vehicle that optimizes a route of travel of the remote vehicle responsive to receiving the second V2X message. The computer program product where the computer-executable code includes additional computer-executable code that, when executed by the processor, causes the processor to: determine a geographic area that has not been scanned by sensors of the set of connected vehicles; and scan the geographic area to determine sensor data describing information about another candidate parking space. Implementations of the described techniques may include hardware, a method or process, or computer software on a computer-accessible medium.

One general aspect includes a method including: determining that an ego vehicle is traveling in search of an available parking space; and forming a vehicular micro cloud responsive to the determination that the ego vehicle is traveling in search of the available parking space. Other embodiments of this aspect include corresponding computer systems, apparatus, and computer programs recorded on one or more computer storage devices, each configured to perform the actions of the methods.

Implementations may include one or more of the following features. The method where the ego vehicle is an autonomous vehicle and the computer-executable code includes additional computer-executable code that, when executed by the processor, causes the processor to provide an automated valet parking (AVP) service. The method where the vehicular micro cloud includes a set of member vehicles including the ego vehicle and at least one remote vehicle. The method further including determining a geographic area that has not be scanned by sensors of the member vehicles; and scanning the geographic area to determine sensor data describing information about another candidate parking space. The method further including: causing a sensor to record sensor data describing information about a candidate parking space; determining, based on the sensor data, occupancy data describing whether the candidate parking space is available; and transmitting a wireless message to the other member vehicles describing whether the candidate parking space is available. The method further including predicting when an unavailable parking space will become available based on the occupancy data and the sensor data. The method further including determining a route of travel based on whether the candidate parking space is available. The method where the route of travel is optimized for at least one of the following: traveling to the available parking space; and traveling to avoid an unavailable parking space. Implementations of the described techniques may include hardware, a method or process, or computer software on a computer-accessible medium.

One general aspect includes a system including: an ego vehicle including a processor executing computer-executable code that is operable, when executed by the processor, to cause the processor to: determine that the ego vehicle is traveling in search of an available parking space; and form a vehicular micro cloud responsive to the determination that the ego vehicle is traveling in search of the available parking space. Other embodiments of this aspect include corresponding computer systems, apparatus, and computer programs recorded on one or more computer storage devices, each configured to perform the actions of the methods.

Implementations may include one or more of the following features. The system where the ego vehicle is an autonomous vehicle and the computer-executable code includes additional computer-executable code that, when executed by the processor, causes the processor to provide an AVP service. The system where the vehicular micro cloud includes a set of member vehicles including the ego vehicle and at least one remote vehicle. The system where the processor is further operable to: determine a geographic area that has not been scanned by sensors of the member vehicles; and scan the geographic area to determine sensor data describing information about another candidate parking space. The system where the processor is further operable to: cause a sensor to record sensor data describing information about a candidate parking space; determine, based on the sensor data, occupancy data describing whether the candidate parking space is available; and transmit a wireless message to the other member vehicles describing whether the candidate parking space is available. The system where the processor is further operable to predict when an unavailable parking space will become available based on the occupancy data and the sensor data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A and 4B are block diagrams illustrating DSRC data according to some embodiments.

DETAILED DESCRIPTION

Figure 1:
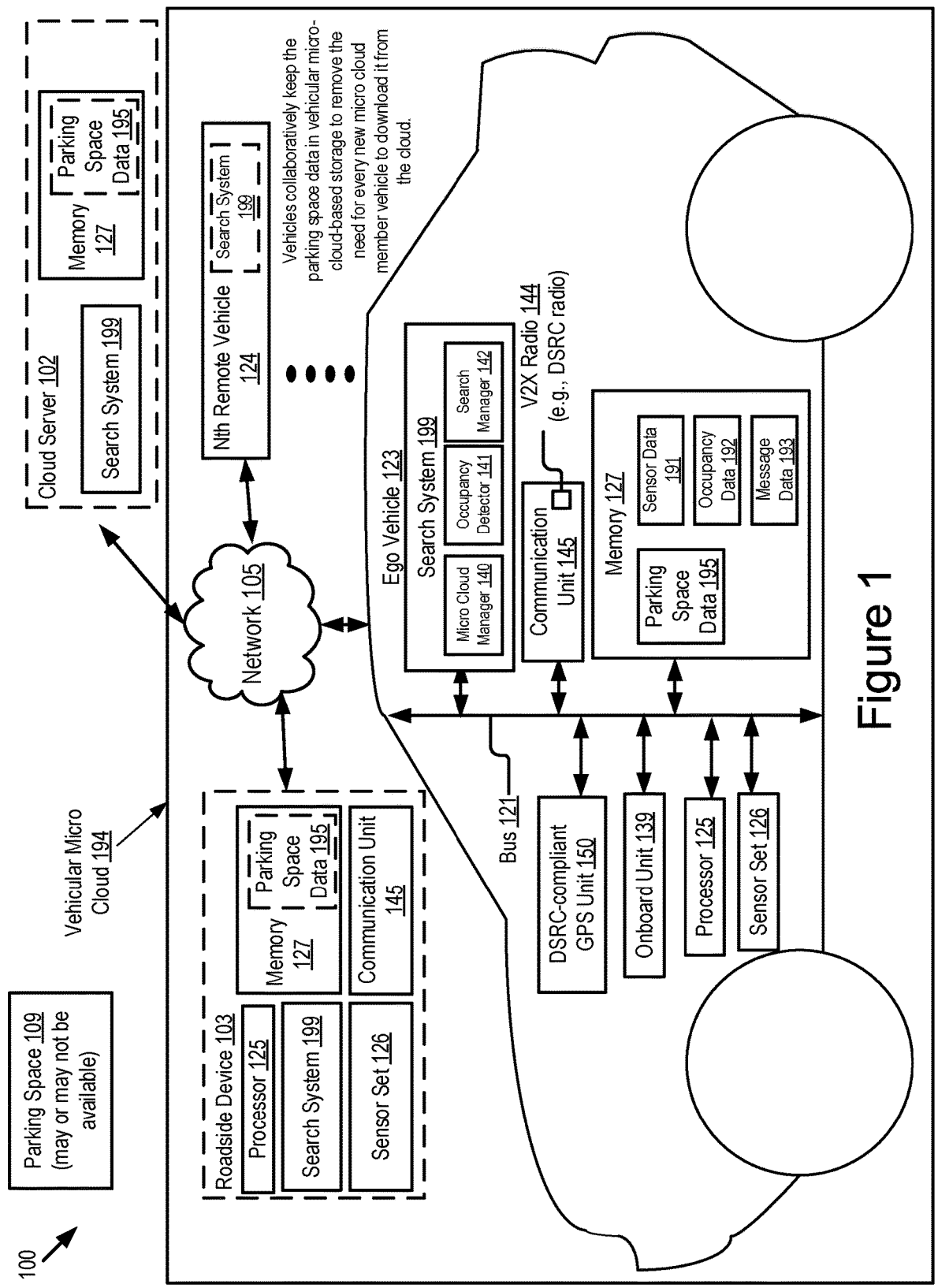
FIG. 1 is a block diagram illustrating an operating environment for a search system according to some embodiments.

Our invention is motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over vehicle-to-vehicle (V2V) networks or V2X networks to perform computation, data storage, and data communication tasks in an efficient way.

Vehicular micro clouds are beneficial, for example, because they help vehicles to perform computationally expensive tasks that they could not perform alone or store large data sets that they could not store alone. The members that form a vehicular micro cloud may execute computing processes (e.g., such as those depicted in FIGS. 3A and 3B or FIG. 5) together in parallel by a cooperative process. Individual steps of the computing processes may be executed by one or more vehicles in a collaborative fashion. The cooperative process may include the members exchanging V2X communications with one another that communicate outputs of their computations or digital data that may be beneficial to other members.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; a roadside device; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as a roadside device.

As used herein, the term "vehicle" refers to a connected vehicle that includes a communication unit that enables the connected vehicle to send and receive wireless messages via one or more vehicular networks. Accordingly, as used herein, the terms "vehicle" and "connected vehicle" may be used interchangeably.

A problem is that it can be difficult for drivers of traditional vehicles, or the computers of autonomous vehicles, to locate an available parking space.

The existing solution for helping a vehicle to locate a parking space includes installing sensors at the site of parking spaces. For example, the sensors are installed under the surface of a parking space or at a parking meter which is located at the site of the parking space. The sensors are electronically coupled to a wireless hub. The wireless hub collects sensor measurements and relays wireless messages to a cloud server. The wireless messages include the sensor measurements. The cloud server analyzes the sensor measurements and determines whether a parking space is available.

The existing solution is inadequate because, for example, it is dependent on a sensor infrastructure which is very expensive to install and maintain. As a result of the expense of the sensor infrastructure, as well as other factors, the sensor infrastructure necessary to implement this existing solution is only available in limited areas and generally thought by experts to be too expensive to implement for many localities. The sensor infrastructure is also possibly unsustainable for some localities due to ongoing maintenance costs which are necessary for the sensors to be reliable.

An example purpose of the embodiments described herein is to use a vehicular micro cloud to enable connected vehicles to collaboratively search for an available parking space using one or more vehicular networks. A vehicular network includes, for example, one or more of the following: V2V; V2X; vehicle-to-network-to-vehicle (V2N2V); vehicle-to-infrastructure (V2I); any derivative or combination of the networks listed herein; and etc. Another example purpose of the embodiments described herein is to provide a mechanism for a vehicular micro cloud to collaboratively maintain and update parking space data which are stored by the micro cloud members.

Described herein are embodiments of a search system that solves the problem described in the preceding paragraph. In some embodiments, the search system includes software installed in an onboard unit of a connected vehicle or an onboard computer of a roadside device such as a Roadside Unit (RSU). This software is the "search system" described herein. In some embodiments, the search system includes: (1) a micro cloud manager; (2) an occupancy detector; and (3) a search manager. Each of these elements are described below in more detail according to some embodiments.

The embodiments of the search system described herein are an improvement over the existing solution because, for example, it costs very little money to implement and is reliable. The embodiments of the search system costs little to implement because it leverages the sensors that are already installed in vehicles. These sensors are known to be reliable and require little maintenance. By comparison, the existing solution does not utilize the sensors that are installed in vehicles in any way. The embodiments of the search system described herein are an improvement over the current technology for this example reason.

Another benefit of the embodiments described herein is that these embodiments utilize vehicular micro cloud technology, which is proven to be reliable. By comparison, the existing solution does not utilize vehicular micro cloud technology in any way. There is no existing solution that uses vehicular micro clouds to enable vehicles to collaborate with one another to use their own onboard sensors to identify available parking spaces.

An example operating environment for the embodiments described herein includes an ego vehicle and at least one remote vehicle. The ego vehicle and the remote vehicle are both connected vehicles having communication units that enable them to send and receive wireless messages via one or more vehicular networks. The ego vehicle and the remote vehicle each include an onboard unit having a search system stored therein.

In some embodiments, the search system includes code and routines that are operable, when executed by a processor of the onboard unit, to cause the processor to execute one or more of the following steps of a "general example method" which is now described:

(1) determine whether a vehicle is searching for a parking space;

(2) if the vehicle is searching for a parking space, the micro cloud manager includes code and routines that are operable to communicate with other nearby connected vehicles and form a vehicular micro cloud (an example of this step is described in U.S. patent application Ser. No. 15/799,963 according to some embodiments) that includes two or more micro cloud members;

(3) download parking space data from a cloud server (or some other endpoint) and store it in a non-transitory memory of one or more of the micro cloud members (the parking space data is digital data that describes the geographic location of parking spaces; the parking space data does not describe whether these parking spaces are available or not available);

(4) if parking space data is not available at step 3, then the micro cloud members collaboratively generate the parking space data;

(5) generate occupancy data which is digital data that describes the locations of parking spaces and whether these parking spaces are available;

(6) determine, based on occupancy data, whether a parking space is available nearby where the vehicle is currently searching;

(7) if no parking space is available at step 6, then use V2X messages to send out a "negative report" to the other micro cloud members (a negative report is a wireless message that includes digital data that describes the GPS location of the parking spaces where no parking space is available and an indication, i.e., a text description or some other indication, that no available parking spaces are nearby this GPS location); and (8) if a parking space is available at step 6, then execute one or more of the following sub-steps: (a) take one of the available spots; and (b) send out a "positive report" to the other members (a positive report is a wireless message that includes digital data that describes (i) the GPS locations of the parking spaces (from the parking space data) where parking spaces are available, and (ii) the GPS locations of the parking spaces (from the parking space data) where no parking space is available).

In some embodiments, the search manager includes code and routines that are operable, when executed by the processor, to cause the processor to execute steps 6-8 of the general example method.

In some embodiments, the general example method provides what is described as a "parking spot search service" to members of the micro vehicular cloud 194.

Parking Space Data

With reference to step 4 of the general example method described above, an example of how micro cloud members collaboratively generate parking space data is now described according to some embodiments. The parking space data may be generated by the occupancy detector which is included in the search system. The occupancy detector includes code and routines that are operable to cause the processor of the vehicles to execute one or more of the following steps:

(1) cause their onboard sensors to record sensor data which is digital data describing the geographic locations of one or more parking spaces;

(2) generate parking space data based on the sensor data;

(3) store the parking space data;

(4) transmit V2X messages to other micro cloud members that includes the parking space data they have generated;

(5) receive V2X messages from other micro cloud members that includes the parking space data that these other members generated;

(6) fuse the parking space data generated by this vehicle with the parking space data generated by the other micro cloud members;

(7) transmit V2X messages with the other micro cloud members to ensure that all the members agree about what the fused parking space data should look like;

(8) store the fused parking space data in a designated non-transitory memory (or across various non-transitory memories) of the micro cloud members; and (9) store the parking space data in the cloud server. Step 9 is an optional feature according to some embodiments.

In some embodiments, the parking space data describes the geographic location of the parking spaces with lane-level accuracy (e.g., plus or minus 3 meters relative to the action location in the real world). The parking space data may be indexed and searchable based on geographic locations (e.g., the parking space data is indexed based on the different geographic locations which are described by the GPS data).

Occupancy Data

With reference to step 5 of the general example method, an example of how occupancy data is generated according to some embodiments is now described. The occupancy data may be generated by the occupancy detector which is included in the search system. In some embodiments, the occupancy detector includes code and routines that are operable to generate the occupancy data. The occupancy detector includes code and routines that are operable to cause the processor of the vehicles to execute one or more of the following steps:

(1) retrieve GPS data describing the vehicles' current geographic location;

(2) cause their onboard sensors to record sensor data which, as used in this step, is digital data describing the environment surrounding the vehicle (e.g., the sensor data describes the locations of vehicles in the environment as well as the locations and flow of pedestrians near these vehicles);

(3) compare the sensor data to the parking space data to determine whether the vehicles are located in parking spaces, i.e., whether the parking spaces are occupied (the output of this comparison is the occupancy data); and (4) use the sensor data to predict whether parking spaces are likely to be occupied soon (e.g., when a member vehicle detects another vehicle waiting in front of a certain parking space) or become available in the near term (e.g., when a member vehicle detects pedestrians coming back to their vehicles). In some embodiments, this prediction is described by the occupancy data. Step 4 described in this paragraph is optional according to some embodiments.

Collaborative Search

In some embodiments, the general example method may be modified to include collaborative search functionality. For example, the search system includes additional code and routines which, when executed by the processor, cause the processor to: (1) determine, based on the parking space data, what geographic areas have not been searched by other members; (2) for geographic areas that are not recently searched, use the vehicle's onboard sensors to search to determine if spaces are available; and (3) update the parking space data appropriately. Lidar, camera, radar and/or sonar measurements combined with GPS data may be used at step 1 of this paragraph to determine the geographic locations of searched areas.

Route Optimization

The general example method described above is simplified because it assumes that the ego vehicle itself is not benefitting from the positive reports and negative reports received from other members. In practice this is not the case. The search manager includes code and routines that utilize the positive reports and the negative reports. In particular, the search manager includes code and routines that are operable, when executed by the processor, to cause the processor to monitor (1) the occupancy data generated by its own occupancy detector and (2) the positive reports and negative reports received from other members, and use this information to determine and suggest efficient routes that are optimized to minimize the amount of time searching for a parking space.

In some embodiments, the search manager may consider the following criteria when determining an efficient route: avoid re-investigating the areas that were recently reported to be occupied; and prioritizing the areas which are more convenient to park (e.g., closer to an entrance of a parking garage) and/or closer to the vehicle's current geographic location.

In some embodiments, the search manager sends negative reports when a vehicle finds no available space in an investigated area.

Allocating Parking Spaces

In some embodiments, when the search system finds multiple available parking spaces in the surroundings (in addition to the one it uses on its own), the search manager includes code and routines that are operable, when executed by the processor, to: (1) allocate the available parking spaces to other micro cloud members; and (2) send positive reports to the selected members. With reference to step 1 of this paragraph, in some embodiments the search manager takes the following example factors into consideration when allocating parking spaces to the different micro cloud members: (a) prioritize members that are more likely to reach the available spot before it becomes occupied by other vehicles (e.g., the ones closer to the available spots); (b) prioritize members who have actively sent positive/negative reports in the past (to guarantee fairness and incentivize vehicles' active contributions).

In some embodiments, if no micro cloud member is likely to be able to fill the available parking space (e.g., if many non-member vehicles are around the available spot), the search manager may choose not to send the positive report to avoid an unsuccessful recommendation.

Example benefits of the search system are now described according to some embodiments.

A first example benefit is that micro cloud members can search for available spaces more efficiently by leveraging "swarm intelligence" of multiple micro cloud members.

A second example benefit is that micro cloud members notify each other when they determine that there is no available parking space in an area they have just investigated. This is beneficial because it allows micro cloud members to: avoid exploring the rows/streets/areas that are unlikely to have available space; and comb rows/streets/areas that are not yet searched for parking space to have a full picture of the area.

A third example benefit is that micro cloud members share information with other micro cloud members about available parking spaces, which are detected by the micro cloud member's own on-board sensors. Micro cloud members may optionally send this information to only micro cloud members that are likely to reach the available spaces before the spaces are occupied by other vehicles. Micro cloud members may also predict the parking spaces that are likely to be occupied soon (e.g., when a micro cloud member detects another vehicle waiting in front of a certain parking space) to suppress unsuccessful recommendation to other micro cloud members. Micro cloud members may also predict the spaces that are likely to become available in a short period of time (e.g., when a member vehicle detects pedestrians coming back to their cars, etc.) based on their sensor measurements to send recommendation to other micro cloud members in a more timely fashion.

A fourth example benefit is that a vehicular micro cloud is formed based solely on identifying that a current state for a vehicle is that the vehicle is searching for an available parking space.

Accordingly, the embodiments of the search system described herein provide a mechanism for a vehicular micro cloud to inform a driver, or an autonomous driving system, about the geographic locations where parking spaces are available and the geographic locations where parking spaces are not available. The embodiments also provide an approach to trigger the formation of a vehicular micro cloud based solely on identifying that a vehicle is searching for an available parking space. No other existing solution involving vehicular micro clouds includes identifying that a vehicle is searching for an available parking space as a triggering mechanism for forming a vehicular micro cloud.

This application is related to U.S. patent application Ser. No. 15/644,197 filed on Jul. 7, 2017 and entitled "Computation Service for Mobile Nodes in a Roadway Environment," the entirety of which is hereby incorporated by reference.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof:EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

A vehicular micro cloud is not a V2X network or a V2V network. For example, neither a V2X network nor a V2V network include vehicles joined in a cluster, and a same geographic region, that make available their unused computing resources to the other members of the vehicular micro cloud. In some embodiments, any of the steps of the methods described herein may be executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

Embodiments of the search system are now described. Referring now to FIG. 1, depicted is a block diagram illustrating an operating environment 100 for a search system 199 according to some embodiments. The operating environment 100 is present in a geographic region so that each of the elements of the operating environment 100 is present in the same geographic region.

The operating environment 100 may include one or more of the following elements: an ego vehicle 123 (referred to herein as a "vehicle 123" or an "ego vehicle 123"); a roadside device 103; an Nth remote vehicle 124 (where "N" refers to any positive whole number greater than one); a cloud server 102; and a parking space 109. Each of these elements, exclusive of the cloud server 102 and the parking space 109, is an element of a vehicular micro cloud 194. These elements of the operating environment 100, with the exception of the parking space 109, may be communicatively coupled to one another via a network 105. These elements of the operating environment 100 are depicted by way of illustration. In practice, the operating environment 100 may include one or more of the elements depicted in FIG. 1. The roadside device 103 and the cloud server 102 are depicted in FIG. 1 using a dashed line to indicate that they are optional elements of the operating environment 100. The Nth remote vehicle 124 is referred to herein as a "remote vehicle 124" or a "vehicle 124."

In the depicted embodiment, the ego vehicle 123 and the roadside device 103 include similar elements. For example, each of these elements of the operating environment 100 include their own processor 125, bus 121, memory 127, communication unit 145, processor 125, sensor set 126, and search system 199. These elements of the ego vehicle 123 and the roadside device 103 provide the same or similar functionality relative to one another. Accordingly, these descriptions will not be repeated in this description. The ego vehicle 123 and the remote vehicle 124 also include similar elements, although this is not necessarily depicted in FIG. 1. For example, the remote vehicle 124 also includes their own processor 125, bus 121, memory 127, communication unit 145, sensor set 126, onboard unit 139, and search system 199.

In the depicted embodiment, the ego vehicle 123, remote vehicle 124, and the roadside device 103 may each store similar digital data. For example, the memory 127 of the ego vehicle 123 may store the parking space data 195 and the memory 127 of the roadside device 103 may store any of the digital data depicted in FIG. 1 as stored by the memory 127 of the ego vehicle 123.

The vehicular micro cloud 194 may be a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. In this patent application the vehicular micro cloud 194 may be a stationary vehicular micro cloud or a mobile vehicular micro cloud. Each of the ego vehicle 123, roadside device 103 and the remote vehicle 124 are vehicular micro cloud members because they are connected endpoints that are members of the vehicular micro cloud 194 that can access and use the unused computing resources (e.g., their unused processing power, unused data storage, etc.) of the other vehicular micro cloud members using wireless communications that are transmitted via the network 105.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194.

In some embodiments, a member of the vehicular micro cloud 194 includes any endpoint (e.g., the ego vehicle 123, the remote vehicle 124, the roadside device 103, etc.) which has completed a process to join the vehicular micro cloud 194 (e.g., a handshake process with the coordinator of the vehicular micro cloud 194). A member of the vehicular micro cloud 194 is described herein as a "member" or a "micro cloud member." In some embodiments, the memory 127 of one or more of the endpoints stores member data 189. The member data 189 is digital data that describes one or more of the following: the identity of each of the micro cloud members; what digital data, or bits of data, are stored by each micro cloud member; what computing services are available from each micro cloud member; and how to communicate with each micro cloud member.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, one or more of the ego vehicle 123 and the remote vehicle 124 are DSRC-equipped vehicles. In some embodiments, the roadside device 103 is a DSRC-equipped device. For example, the ego vehicle 123 includes a DSRC-compliant GPS unit 150 and a DSRC radio (e.g., the V2X radio 144 is a DSRC radio in embodiments where the ego vehicle 123 is a DSRC-equipped vehicle) and the roadside device 103 includes a communication unit 145 having a DSRC radio similar to the one included in the ego vehicle 123. The network 105 may include a DSRC communication channel shared among the ego vehicle 123 and a second vehicle.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a DSRC-compliant GPS unit 150; a communication unit 145; an onboard unit 139; a memory 127; and a search system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the search system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data 191 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data 191 that describes the occupancy of a parking space at one or more different times, images or other measurements of the physical environment and objects or other vehicles present in the roadway environment such as pedestrians, animals, traffic signs, traffic lights, pot holes, etc.

The physical environment may include a roadway region, parking lot, or parking garage that is proximate to the ego vehicle 123. The sensor data 191 may describe measurable aspects of the physical environment.

In some embodiments, the sensors of the sensor set 126 are operable to collect sensor data 191. The sensors of the sensor set 126 include any sensors that are necessary to measure and record the measurements described by the sensor data 191. In some embodiments, the sensor data 191 includes any measurements that are necessary to generate the occupancy data 192. For example, the sensor data 191 describes whether a parking space is occupied, how long a parking space has been observed as occupied or unoccupied, or the flow of pedestrians near the parking space.

In some embodiments, the sensor data 191 describes any of the information that is included in the message data 193 and depicted in FIGS. 4A and 4B. In some embodiments, the sensor set 126 includes any sensors that are necessary to record the information that is included in the message data 193.

The message data 193 is digital data that describes information included as the payload for a V2X message. In some embodiments, the message data 193 is the payload for a DSRC message or any other type of V2X message. Examples of the message data 193 are depicted in FIGS. 4A and 4B according to some embodiments. The message data 193 may be a means for the ego vehicle 123 to receive the occupancy data 192 generated by one or more of other member vehicles (such as the remote vehicle 124). In some embodiments, the ego vehicle 123 generates its own message data 193 using its own sensor data 191 and occupancy data 192 and transmits V2X messages including this message data 193 as its payload. In some embodiments, the ego vehicle 123 uses the V2X radio 144 to broadcast DSRC messages including this message data 193 as its payload. In this way, other vehicles (such as the remote vehicle 124) may learn of the occupancy data 192 generated by the ego vehicle 123. These other vehicles also execute this process.

In some embodiments, the DSRC messages (or V2X messages including message data 193) may be treated as a form of feedback that: confirms the accuracy of a vehicle's own sensor measurements; is used to improve the accuracy of these sensor measurements; or is used as an input to a learning algorithm that improves the accuracy of a vehicle's sensor measurements over time based on the feedback received from other vehicles.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the vehicle 123 may be accurately determined based on the GPS data for this vehicle 123 as provided by the DSRC-compliant GPS unit 150.

An example process for generating GPS data describing a geographic location of a parking space is now described according to some embodiments. In some embodiments, the sensor system 199 include code and routines that are operable, when executed by the processor 125, to cause the processor to: analyze (1) GPS data describing the geographic location of the ego vehicle 123 and (2) sensor data 191 describing the range separating the ego vehicle 123 from a parking space and a heading for this range; and determine, based on this analysis, GPS data describing the location of the parking space. The GPS data describing the location of the parking space may also have lane-level accuracy because, for example, it is generated using accurate GPS data of the ego vehicle 123 and accurate sensor data describing information about the parking space.

In some embodiments, the DSRC-compliant GPS unit 150 includes hardware that wirelessly communicates with a GPS satellite (or GPS server) to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the search system 199 described herein may analyze the GPS data provided by the DSRC-compliant GPS unit 150 and determine what lane the ego vehicle 123 is traveling in based on the relative positions of two or more different vehicles (one of which is, for example, the ego vehicle 123) traveling on a roadway at the same time.

By comparison to the DSRC-compliant GPS unit 150, a conventional GPS unit which is not compliant with the DSRC standard is unable to determine the location of a vehicle 123 with lane-level accuracy. For example, a typical parking space is approximately 3 meters wide. However, a conventional GPS unit only has an accuracy of plus or minus 10 meters relative to the actual location of the ego vehicle 123. As a result, such conventional GPS units are not sufficiently accurate to enable the search system 199 to determine the lane of travel of the ego vehicle 123. This measurement improves the accuracy of the GPS data describing the location of parking spaces used by the search system 199 when providing its functionality.

In some embodiments, the memory 127 stores two types of GPS data. The first is GPS data of the ego vehicle 123 and the second is GPS data of a parking space or one or more parking spaces. The GPS data of the ego vehicle 123 is digital data that describes a geographic location of the ego vehicle 123. The GPS data of the parking space is digital data that describes a geographic location of a parking space. One or more of these two types of GPS data may have lane-level accuracy. In some embodiments, one or more of these two types of GPS data are described by the sensor data 191.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting Basic Safety Message ("BSM message" if singular, or "BSM messages" if plural). In some embodiments, the non-transitory memory stores a buffered version of the GPS data for the ego vehicle 123 so that the GPS data for the ego vehicle 123 is broadcast as an element of the BSM messages which are regularly broadcast by the V2X radio 144 (e.g., at an interval of once every 0.10 seconds). An example of the digital data that is included in a BSM message is depicted in FIGS. 13A and 13B. For example, in some embodiments a BSM message is a type of DSRC message.

In some embodiments, the V2X radio 144 includes any hardware or software which is necessary to make the ego vehicle 123 compliant with the DSRC standards. In some embodiments, the DSRC-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 191; the message data 193; the parking space data 195; and the occupancy data 192.

The sensor data 191 is digital data that describes the environment of the connected vehicle. The sensor data 191 describes the measurements of the sensors included in the sensor set 126. In some embodiments, the search system 199 includes code and routines that are operable, when executed by the processor 125, to cause the processor 125 to: execute or activate one or more sensors of the sensor set 126 to cause to record the sensor measurements that are described by the sensor data 195; and store these sensor measurements as the sensor data 195 in the memory 127.

The message data 193 is digital data that describes the payload for a DSRC message or some other V2X message transmitted or received by the ego vehicle 123. Examples of the information described by the message data 193 according to some embodiments is depicted in FIGS. 4A and 4B. In some embodiments, the search system 199 includes code and routines that are operable, when executed by the processor 125, to cause the processor 125 to: analyze the sensor data 191 and the parking space data 195; generate the occupancy data 192 based on the sensor data 191 and the occupancy data 192; generate the message data 193 based at least in part on the occupancy data 192; and store the message data 193 in the memory 127 or as the payload for a DSRC message or some other type of V2X message to be transmitted by the communication unit 145 to another member.

In some embodiments, the message data 193 is the payload for a V2X message that is received by the ego vehicle 123 where this V2X message was previously transmitted by one or more DSRC-enabled vehicles. For example, the V2X message is a DSRC message such as a BSM message. In this embodiment, the message data 193 is digital data including occupancy data 192 determined by the DSRC-enabled vehicle that originally transmitted the V2X message including the message data 193.

The parking space data 195 is digital data that describes the geographic location of one or more parking spaces included in a geographic region. The parking space data 195 does not describe whether these parking spaces are available or not available. In other words, the parking space data 195 does not describe whether or not a parking space is occupied by a vehicle or not at a certain time. In some embodiments, the geographic location of the parking spaces as described by the parking space data 195 is described with lane-level accuracy (e.g., plus or minus 3 meters relative to the action location in the real world). The parking space data 195 may be indexed and searchable by the search system 199 based on geographic locations (e.g., GPS data describing the current geographic location of the ego vehicle 123, which returns a set of parking spaces in the region of the current geographic location of the ego vehicle 123).

The occupancy data 192 is digital data that describes the locations of parking spaces and whether these parking spaces are available.

Figure 3A:
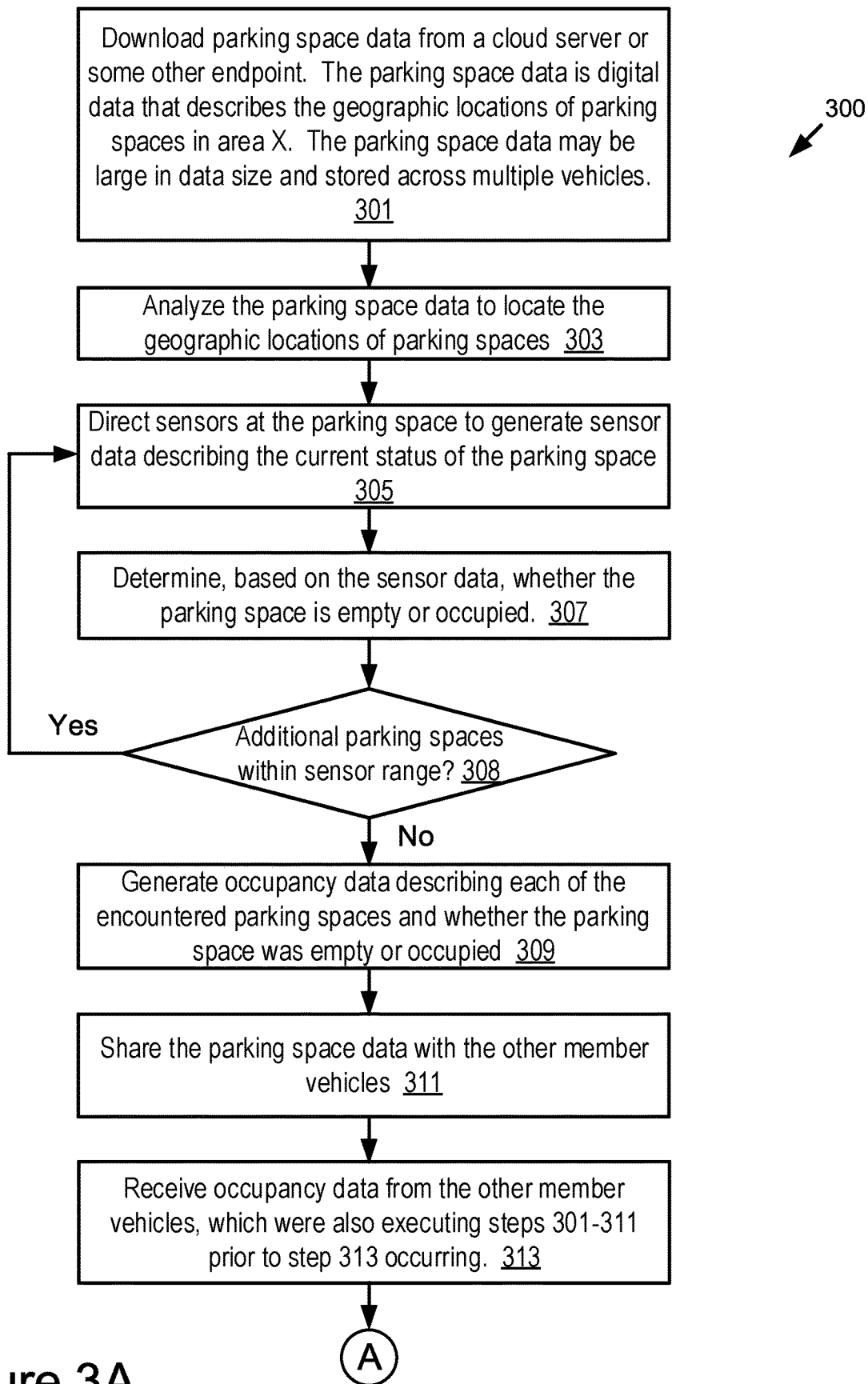
FIGS. 3A and 3B are a flowchart of an example method for locating an available parking space according to some embodiments.
Figure 3B:
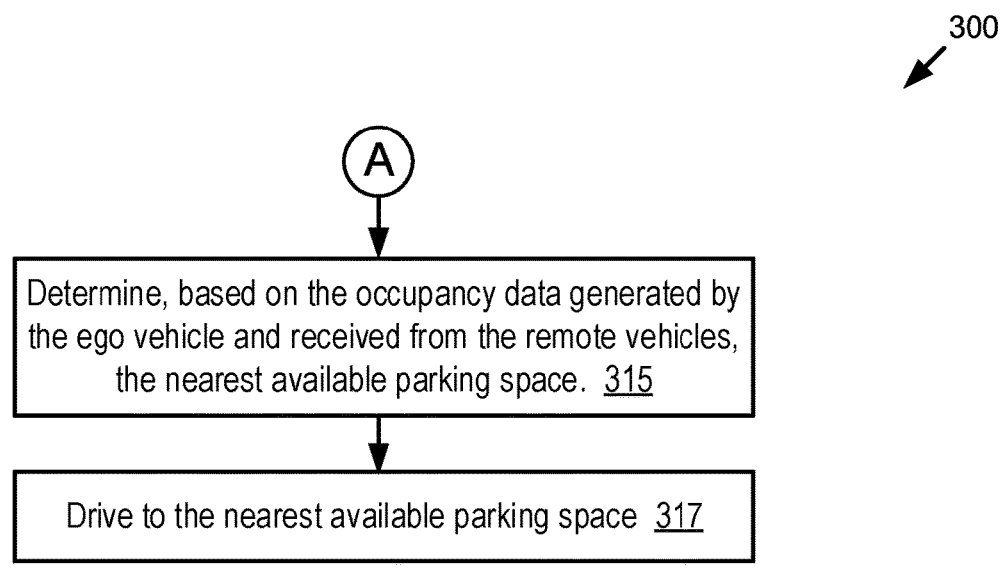
Figure 5:
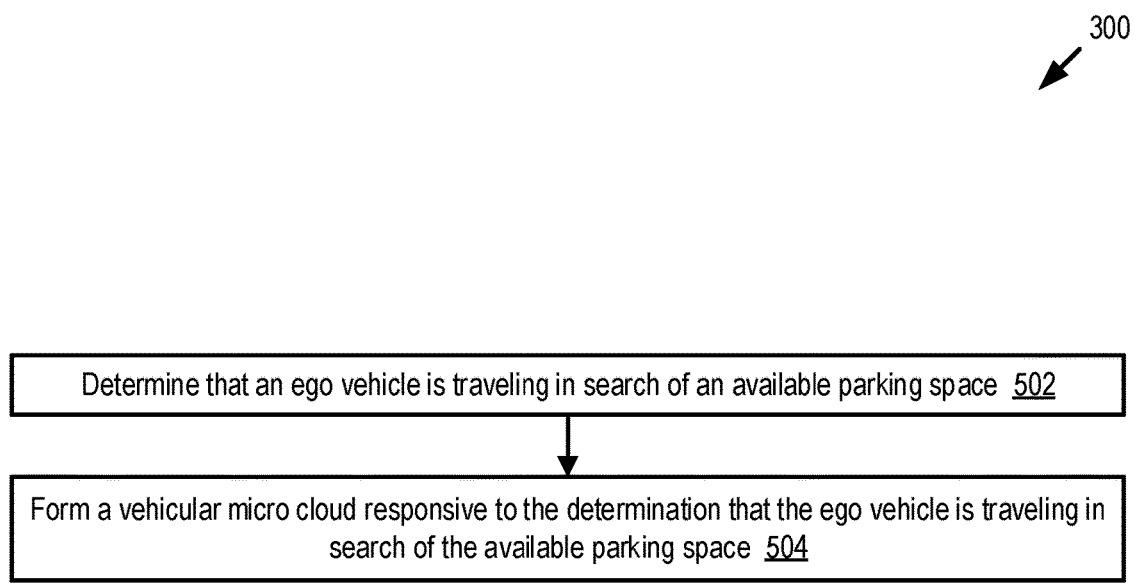
FIG. 5 is a flowchart of an example method for locating an available parking space according to some embodiments.

In some embodiments, the search system 199 includes code and routines that are operable, when executed by the processor 125, to execute one or more steps of one or more of the methods 300, 500 described herein with reference to FIGS. 3A, 3B, and 5.

As depicted, the search system 199 includes the following elements: a micro cloud manager 140; an occupancy detector 141; and a search manager 142.

In some embodiments, the search system 199 includes code and routines that are operable, when executed by a processor 125 of the onboard unit 139, to cause the processor 125 to execute one or more of the following steps of a general example method:

(1) determine whether the ego vehicle 123 is searching for an available parking space 109;

(2) if the ego vehicle 123 is searching for the available parking space 109, the micro cloud manager 140 includes code and routines that are operable to communicate with other nearby connected vehicles (e.g., the remote vehicle 124) and form a vehicular micro cloud 194 that includes two or more micro cloud members;

(3) download parking space data 195 from a cloud server 102 (or some other endpoint) and store it in a non-transitory memory of one or more of the micro cloud members (e.g., one or more memories 127 of the members);

(4) if parking space data 195 is not available at step 3, then the micro cloud members collaboratively generate the parking space data 195;

(5) generate occupancy data 192;

(6) determine, based on occupancy data 192, whether a parking space 109 is available nearby where the ego vehicle 123 is currently searching;

(7) if no parking space 109 is available at step 6, then use V2X messages to send out a "negative report" to the other micro cloud members (a negative report is a wireless message that includes digital data that describes the GPS location of the parking spaces where no parking space is available and an indication, i.e., a text description or some other indication, that no available parking spaces are nearby this GPS location); and (8) if a parking space is available at step 6, then execute one or more of the following sub-steps: (a) take one of the available parking spaces; and (b) send out a "positive report" to the other members (a positive report is a wireless message that includes digital data that describes (i) the GPS locations of the parking spaces 109, from the parking space data 195, where parking spaces 109 are available, and (ii) the GPS locations of the parking spaces 109, from the parking space data 195, where no parking space is available).

In some embodiments, the search manager 142 includes code and routines that are operable, when executed by the processor, to cause the processor to execute steps 6-8 of the general example method described above.

With reference to step 4 of the general example method described above, an example of how micro cloud members collaboratively generate parking space data 195 is now described according to some embodiments. The parking space data 195 may be generated by the occupancy detector 141 which is included in the search system 199. The occupancy detector 141 includes code and routines that are operable to cause the processor 123 of the vehicles 123, 124 to execute one or more of the following steps:

(1) cause their onboard sensors to record sensor data 191 which is digital data describing the geographic locations of one or more parking spaces;

(2) generate parking space data 195 based on the sensor data 191;

(3) store the parking space data 195;

(4) transmit V2X messages to other micro cloud members that includes the parking space data 195 they have generated;

(5) receive V2X messages from other micro cloud members that include the parking space data 195 that these other members generated;

(6) fuse the parking space data 195 generated by this vehicle (e.g., ego vehicle 123) with the parking space data 195 generated by the other micro cloud members (e.g., remote vehicle 124);

(7) transmit V2X messages with the other micro cloud members to ensure that all the members agree about what the fused parking space data 195 should look like;

(8) store the fused parking space data 195 in a designated non-transitory memory (or across various non-transitory memories) of the micro cloud members; and (9) store the parking space data 195 in the cloud server 102. Step 9 is an optional feature according to some embodiments.

In some embodiments, the parking space data 195 describes the geographic location of the parking spaces 109 with lane-level accuracy (e.g., plus or minus 3 meters relative to the action location in the real world). The parking space data 195 may be indexed and searchable based on geographic locations (e.g., the parking space data is indexed based on the different geographic locations which are described by the GPS data).

With reference to step 5 of the general example method, an example of how occupancy data 192 is generated according to some embodiments is now described. The occupancy data 192 may be generated by the occupancy detector 141 which is included in the search system 199. In some embodiments, the occupancy detector 141 includes code and routines that are operable to generate the occupancy data 192. The occupancy detector 141 includes code and routines that are operable to cause the processor 125 of the vehicles to execute one or more of the following steps:

(1) retrieve GPS data describing the vehicles' current geographic location;

(2) cause their onboard sensors to record sensor data 191 which, as used in this step, is digital data describing the environment surrounding the vehicle (e.g., the sensor data 191 describes the location of vehicles in the environment proximate to the ego vehicle 123 as well as the locations and flow of pedestrians near these vehicles);

(3) compare the sensor data 191 to the parking space data 195 to determine whether the vehicles are located/parked in parking spaces, i.e., whether the parking spaces are occupied by these vehicles (the output of this comparison is the occupancy data 192); and (4) use the sensor data 191 to predict whether parking spaces are likely to be occupied soon (e.g., when a member detects another vehicle waiting in front of a certain parking space) or become available in the near term (e.g., when a member detects pedestrians coming back to their parked vehicles). In some embodiments, this prediction is described by the occupancy data 192. Step 4 described in this paragraph is optional according to some embodiments.

In some embodiments, the general example method may be modified to include collaborative search functionality. For example, the search system 199 includes additional code and routines which, when executed by the processor 125, cause the processor 125 to: (1) determine, based on the parking space data 195, what geographic areas have not been searched by other members; (2) for geographic areas that are not recently searched, use the onboard sensors of the ego vehicle 123 to search to determine if spaces are available; and (3) update the parking space data 195 appropriately based on step 2. Lidar, camera, radar and/or sonar measurements combined with GPS data may be used at step 1 of this paragraph to determine the geographic locations of searched areas.

The general example method described above is simplified because it assumes that the ego vehicle 123 itself is not benefitting from the positive reports and negative reports received from other members. In practice this may not be the case. In some embodiments, the search manager 142 includes code and routines that utilize the positive reports and the negative reports. In particular, the search manager 142 includes code and routines that are operable, when executed by the processor 124, to cause the processor 124 to monitor (1) the occupancy data 192 generated by its own occupancy detector 141 [i.e., the occupancy detector 141 which is included in the same search system 199 as the search manager 142 itself] and (2) the positive reports and negative reports received from other members, and use this information to determine and suggest efficient routes that are optimized to minimize the amount of time searching for a parking space 109.

In some embodiments, the search manager 142 may consider the following criteria when determining an efficient route: avoid re-investigating the areas that were recently reported to be occupied; and prioritizing the areas which are more convenient to park (e.g., closer to an entrance of a parking garage) and/or closer to the vehicle's current geographic location.

In some embodiments, the search manager 141 sends negative reports when a vehicle finds no available parking space 109 in an investigated area.

In some embodiments, when the search system 199 finds multiple available parking spaces 109 in the surrounding area (in addition to the one the ego vehicle 123 determines to occupy for itself), the search manager 142 includes code and routines that are operable, when executed by the processor 124, to: (1) allocate the available parking spaces to other micro cloud members; and (2) send positive reports to the selected members. With reference to step 1 of this paragraph, in some embodiments the search manager 142 takes the following example factors into consideration when allocating parking spaces 109 to the different micro cloud members: (a) prioritize members that are more likely to reach the available spot before it becomes occupied by other vehicles (e.g., the ones closer to the available spots); (b) prioritize members who have actively sent positive/negative reports in the past (to guarantee fairness and incentivize vehicles' active contributions).

In some embodiments, if no micro cloud member is likely to be able to fill the available parking space (e.g., if many non-member vehicles are around the available spot), the search manager 142 may choose not to send the positive report to avoid an unsuccessful recommendation.

In some embodiments, the search system 199 is an element of the onboard unit 139 or some other onboard vehicle computer.

In some embodiments, the search system 199 is implemented using hardware including a field-programmable gate array ("FPGA") or an application-specific integrated circuit ("ASIC"). In some other embodiments, the search system 199 is implemented using a combination of hardware and software.

In some embodiments, the roadside device 103 is a device that (1) includes a communication unit 145 and a processor 125 and (2) is present in an environment (e.g., a roadway environment) with the ego vehicle 123. For example, the roadside device 103 is a roadside unit (RSU) or some other infrastructure device including the communication unit 145 and the processor 125 and present in the same environment as the ego vehicle 123.

As depicted, the roadside device 103 includes the following elements: a memory 127; a bus 121; a processor 125; a communication unit 145; a sensor set 126; and a search system 199. These elements of the roadside device 103 provide similar functionality as those described above for the ego vehicle 123, and so, these descriptions will not be repeated here.

In some embodiments, the roadside device is an edge server or includes an edge server. In some embodiments, the roadside device 103 is not an element of the vehicular micro cloud 194.

The remote vehicle 124 includes elements and functionality which are similar to those described above for the ego vehicle 123, and so, those descriptions will not be repeated here. In some embodiments, the ego vehicle 123 and the remote vehicle 124 are located in a geographic region which is managed by the roadside device 103. For example, the roadside device 103 is a stationary connected device that is responsible for establishing and maintaining stationary vehicular micro clouds at a particular geographic location or within a particular geographic region that includes the geographic locations described by the GPS data of the ego vehicle 123, the remote vehicle 124, and the roadside device 103.

The cloud server 102 is a connected processor-based computing device that is not a member of the vehicular micro cloud 194 and includes an instance of the search system 199 and a non-transitory memory (not pictured) that stores at least one instance of parking space data 195. For example, the cloud server 102 is one or more of the following: a hardware server; a personal computer; a laptop; a device such as the roadside device 103 which is not a member of the vehicular micro cloud 194; or any other processor-based connected device that is not a member of the vehicular micro cloud 194 and includes an instance of the search system 199 and a non-transitory memory that stores at least one instance of parking space data 195. The cloud server 102 may include a backbone network.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123 and the remote vehicle 124), and optionally devices such as the roadside device 103, form a cluster of interconnected vehicles that are located at a same geographic region. These connected vehicles (and, optionally, connected devices) are interconnected via Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 102. Connected vehicles (and devices such as the roadside device 103) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the search system 199 includes encryption keys for encrypting wireless messages and decrypting the wireless messages described herein.

In some embodiments, the functionality of the search system 199 is operable to provide an AVP service. The AVP service is now described according to some embodiments. A driver of the ego vehicle 123 does not need to be in the ego vehicle 123 for the ego vehicle 123 to park itself. Instead, a driver leaves the ego vehicle 123 at a designated location. The search system 199 includes code and routines that are operable to: (1) locate an available parking space using the methods described herein; and (2) cause an autonomous driving system of the ego vehicle 123 to park the ego vehicle 123 at e available parking space. Later, when the driver returns to the designated location, the search system 199 causes the autonomous driving system of the ego vehicle 123 to pick up the driver at the designated location.

In some embodiments, remote vehicles 124 that do not have advanced sensors like lidars, radars, cameras, sonars may also be part of collaborative parking spot search services provided by the search system 199. For example, a vehicle is equipped with only a UPS sensor. If this vehicle passes by a certain parking space while searching for an available parking space, the vehicular micro cloud 194 may estimate that the space is likely to be occupied already. Although the measurement is less accurate than using the advanced sensors, this would help lower the threshold for vehicles to participate in this collaborative parking spot search service.

In some embodiments, members do not need UPS sensors or functioning UPS sensors in order to receive the parking spot search service. For example, if accurate GPS data is not available (e.g., in an urban carryon indoor parking garage), members may alternatively use one or more of the following as a source of digital data to obtain sufficiently accurate vehicle location data: vehicle odometory sensors; inertial sensors; lidars; radars; cameras; sonars; and map matching techniques.

Figure 2:
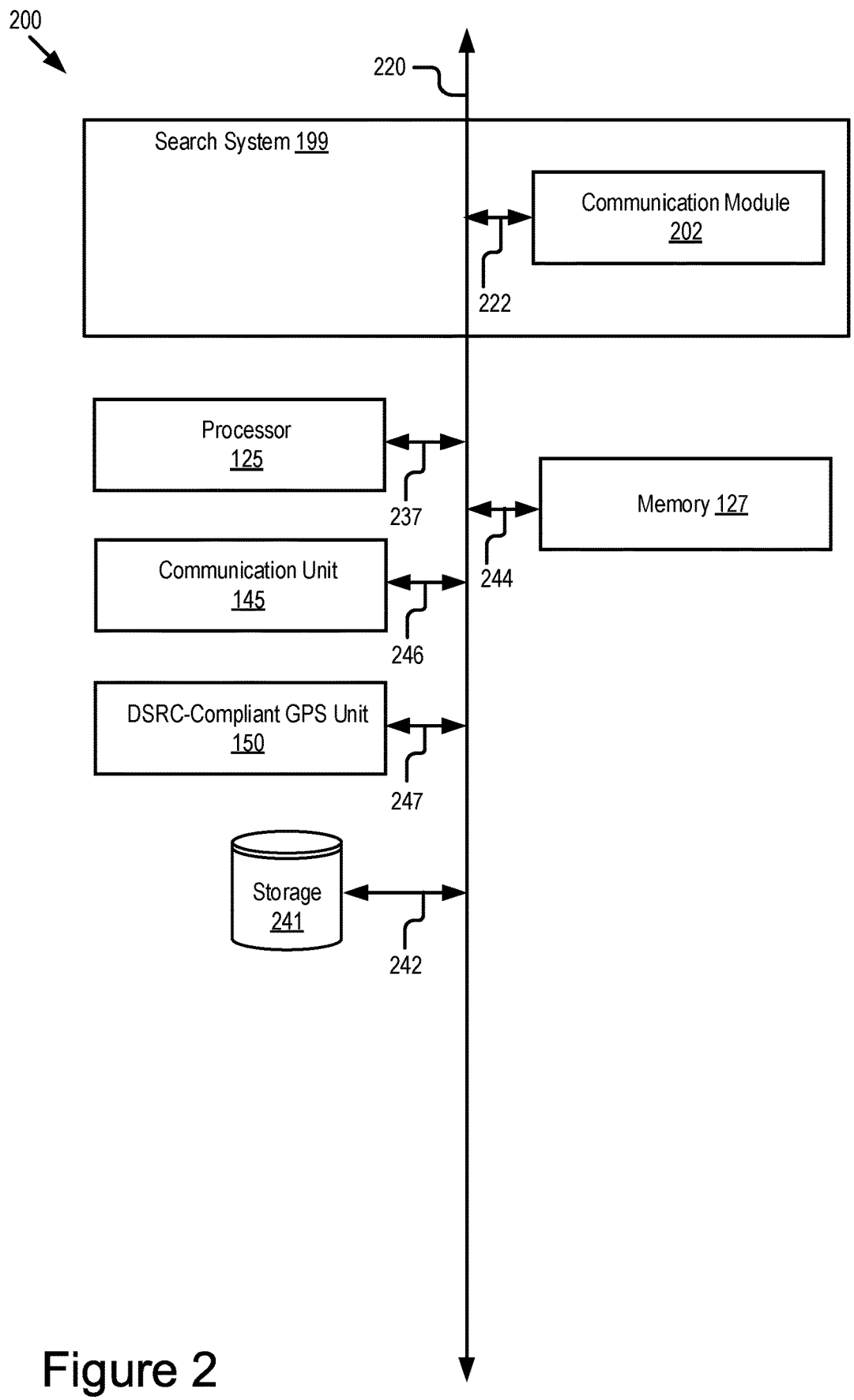
FIG. 2 is a block diagram illustrating an example computer system including a search system according to some embodiments.

Referring now to FIG. 2, depicted is a block diagram illustrating an example computer system 200 including a search system 199 according to some embodiments.

In some embodiments, the computer system 200 may include a special-purpose computer system that is programmed to perform one or more steps of one or more of the methods 300, 500 described herein with reference to FIGS. 3A, 3B, and 5.

In some embodiments, the computer system 200 may include a processor-based computing device. For example, the computer system 200 may include an onboard vehicle computer system of the ego vehicle 123 or the remote vehicle 124; the computer system 200 may also include an onboard computer system of the roadside device 103.

The computer system 200 may include one or more of the following elements according to some examples: the search system 199; a processor 125; a communication unit 145; a DSRC-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the DSRC-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the search system 199 includes code and routines that are operable, when executed by the processor 125, to cause the processor 125 to execute one or more steps of one or more of the methods 300, 500 described herein with reference to FIGS. 3A, 3B, and 5.

In the illustrated embodiment shown in FIG. 2, the search system 199 includes a communication module 202.

The communication module 202 can be software including routines for handling communications between the search system 199 and other components of the computer system 200. In some embodiments, the communication module 202 can be a set of instructions executable by the processor 125 to provide the functionality described below for handling communications between the search system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100 or the operating environment 101.

In some embodiments, the communication module 202 receives data from components of the search system 199 and stores the data in one or more of the storage 241 and the memory 127.

In some embodiments, the communication module 202 may handle communications between components of the search system 199 or the computer system 200.

Referring now to FIGS. 3A and 3B, depicted is a flowchart of an example method 300 for using a vehicular micro cloud to locate an available parking space according to some embodiments. The method 300 includes steps 301, 303, 305, 307, 308, 309, 311, and 313 as depicted in FIG. 3A and steps 315 and 317 as depicted in FIG. 3B. The steps of the method 300 may be executed in any order, and not necessarily those depicted in FIGS. 3A and 3B. In some embodiments, one or more of the steps are skipped or modified in ways that are described herein or known or otherwise determinable by those having ordinary skill in the art of vehicular micro clouds.

Referring now to FIGS. 4A and 4B, depicted are block diagrams illustrating message data 193 according to some embodiments.

The message data 193 may be a payload for a DSRC message, a mmWave message, or any other type of V2X message. The DSRC message may include one or more of a conventional DSRC message, a DSRC probe, or a BSM message.

The regular interval for transmitting V2X messages is user configurable. In some implementations, a default setting for this interval is transmitting the V2X message is every 0.10 seconds or substantially every 0.10 seconds. A V2X message is broadcasted over the 5.9 GHz DSRC band. In some embodiments, the V2X radio of the communication unit includes seven bands for transmitting and receiving V2X messages, with one of these bands being reserved exclusively for transmitting and receiving V2X messages.

The range for transmitting DSRC messages such as BSM messages is substantially 1,000 meters. In some implementations, DSRC range is a range of substantially 100 meters to substantially 1,000 meters.

Referring now to FIG. 4B, depicted is a block diagram illustrating message data 193 according to some embodiments.

A V2X message may include two parts. These two parts may include different message data 193 as shown in FIG. 4B.

Part 1 of the message data 193 describes the following: vehicle position; vehicle heading; vehicle speed; vehicle acceleration; vehicle steering wheel angle; and vehicle size.

Part 2 of the message data 193 includes a variable set of data elements drawn from a list of optional elements. Some of the message data 193 included in Part 2 of the V2X message are selected based on event triggers, e.g., anti-locking brake system ("ABS") being activated may trigger message data 193 relevant to the ABS system of the vehicle.

In some implementations, some of the elements of Part 2 are transmitted less frequently in order to conserve bandwidth.

In some implementations, the message data 193 included in a V2X message includes occupancy data 192. The message data 193 may also include sensor data 191.

Referring now to FIG. 5, depicted is a flowchart of an example method 500 for using a vehicular micro cloud to locate an available parking space according to some embodiments. The method 500 includes steps 502 and 504 as depicted in FIG. 5.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product for a vehicular micro cloud that includes a set of connected vehicles that are operable to provide cooperative searching for an available parking space to the set of connected vehicles, wherein the computer program product comprises a non-transitory memory storing computer-executable code that, when executed by a processor, causes the processor to:
   determine that an ego vehicle is traveling in search of the available parking space;
   form the vehicular micro cloud responsive to the determination that the ego vehicle is traveling in search of the available parking space, wherein forming the vehicular micro cloud includes transmitting a first vehicle-to-everything message (V2X message) to a remote vehicle with instructions to join the vehicular micro cloud;
   causing a sensor to record sensor data describing information about a candidate parking space;
   determine, based on the sensor data, occupancy data describing whether the candidate parking space is the available parking space; and
   transmit a second V2X message to the set of connected vehicles describing that the candidate parking space is the available parking space.

2. The computer program product comprises the non-transitory memory storing the computer-executable code of claim 1, wherein the ego vehicle is an autonomous vehicle that acts to occupy the available parking space responsive to the determination that the candidate parking space is the available parking space.

3. The computer program product comprises the non-transitory memory storing the computer-executable code of claim 1, wherein the remote vehicle is an autonomous vehicle that acts to occupy the available parking space responsive to receiving the second V2X message.

4. The computer program product comprises the non-transitory memory storing the computer-executable code of claim 1, wherein the ego vehicle is an autonomous vehicle that optimizes a route of travel of the ego vehicle to responsive to determining that the candidate parking space is the available parking space.

5. The computer program product comprises the non-transitory memory storing the computer-executable code of claim 1, wherein the remote vehicle is an autonomous vehicle that optimizes a route of travel of the remote vehicle responsive to receiving the second V2X message.

6. The computer program product comprises the non-transitory memory storing the computer-executable code of claim 1, wherein the computer-executable code includes additional computer-executable code that, when executed by the processor, causes the processor to:
   determine a geographic area that has not be scanned by sensors of the set of connected vehicles; and
   scan the geographic area to determine sensor data describing information about another candidate parking space.

7. A method comprising:
   determining that an ego vehicle is traveling in search of an available parking space; and
   forming a vehicular micro cloud responsive to the determination that the ego vehicle is traveling in search of the available parking space, wherein forming the vehicular micro cloud includes transmitting a first vehicle-to-everything message (V2X message) to a remote vehicle with instructions to join the vehicular micro cloud.

8. The method of claim 7, wherein the ego vehicle is an autonomous vehicle and the method further comprises providing an automated valet parking (AVP) service.

9. The method of claim 7, wherein the vehicular micro cloud includes a set of member vehicles including the ego vehicle and at least one remote vehicle.

10. The method of claim 9, further comprising:
    determining a geographic area that has not been scanned by sensors of the member vehicles; and
    scanning the geographic area to determine sensor data describing information about another candidate parking space.

11. The method of claim 9, further comprising:
    causing a sensor to record sensor data describing information about a candidate parking space;
    determining, based on the sensor data, occupancy data describing whether the candidate parking space is available; and
    transmitting a wireless message to other member vehicles describing whether the candidate parking space is available.

12. The method of claim 11, further comprising predicting when an unavailable parking space will become available based on the occupancy data and the sensor data.

13. The method of claim 11, further comprising determining a route of travel based on whether the candidate parking space is available.

14. The method of claim 13, wherein the route of travel is optimized for at least one of the following: traveling to the available parking space; and traveling to avoid an unavailable parking space.

15. A system comprising:
an ego vehicle including a processor executing computer-executable code that is operable, when executed by the processor, to cause the processor to:
determine that the ego vehicle is traveling in search of an available parking space; and
form a vehicular micro cloud responsive to the determination that the ego vehicle is traveling in search of the available parking space, wherein forming the vehicular micro cloud includes transmitting a first vehicle-to-everything message (V2X message) to a remote vehicle with instructions to join the vehicular micro cloud.

16. The system of claim 15, wherein the ego vehicle is an autonomous vehicle and the computer-executable code includes additional computer-executable code that, when executed by the processor, causes the processor to provide an automated valet parking (AVP) service.

17. The system of claim 15, wherein the vehicular micro cloud includes a set of member vehicles including the ego vehicle and at least one remote vehicle.

18. The system of claim 17, wherein the processor is further operable to:
determine a geographic area that has not been scanned by sensors of the member vehicles; and
scan the geographic area to determine sensor data describing information about another candidate parking space.

19. The system of claim 17, wherein the processor is further operable to:
cause a sensor to record sensor data describing information about a candidate parking space;
determine, based on the sensor data, occupancy data describing whether the candidate parking space is available; and
transmit a wireless message to other member vehicles describing whether the candidate parking space is available.

20. The system of claim 19, wherein the processor is further operable to determine a route of travel based on whether the candidate parking space is available and the route of travel is optimized for at least one of the following: traveling to the available parking space; and traveling to avoid an unavailable parking space.

* * * * *